United States Patent
Hundemer

(10) Patent No.: US 10,283,160 B1
(45) Date of Patent: *May 7, 2019

(54) SYSTEMS AND METHODS FOR SWITCHING BETWEEN MULTIPLE SOFTWARE VIDEO PLAYERS LINKED TO A SINGLE OUTPUT

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/238,578

(22) Filed: Aug. 16, 2016

Related U.S. Application Data

(63) Continuation of application No. 13/839,273, filed on Mar. 15, 2013, now Pat. No. 9,451,231.

(51) Int. Cl.
  *H04N 9/87* (2006.01)
  *G11B 20/10* (2006.01)

(52) U.S. Cl.
  CPC ......... *G11B 20/10527* (2013.01); *H04N 9/87* (2013.01); *G11B 2020/1062* (2013.01)

(58) Field of Classification Search
  CPC ...... G11B 20/10527; G11B 2020/1062; H04N 9/87
  USPC ........................................................ 386/356
  See application file for complete search history.

(56) References Cited

U.S. PATENT DOCUMENTS

| | | | |
|---|---|---|---|
| 7,024,677 B1 | 4/2006 | Snyder | |
| 7,835,439 B2 | 11/2010 | Witt | |
| 2005/0097620 A1 | 5/2005 | Fye | |
| 2009/0041422 A1* | 2/2009 | Staker | H04N 5/272 386/353 |
| 2009/0168899 A1 | 7/2009 | Schlanger et al. | |
| 2010/0208142 A1 | 8/2010 | He | |
| 2010/0278517 A1 | 11/2010 | Sakata et al. | |

(Continued)

OTHER PUBLICATIONS

Hundemer, Hank J., U.S. Appl. No. 13/838,990, filed Mar. 15, 2013.

(Continued)

*Primary Examiner* — Thai Q Tran
*Assistant Examiner* — Nien Yang
(74) *Attorney, Agent, or Firm* — McDonnell Boehnen Hulbert & Berghoff LLP

(57) ABSTRACT

Systems and methods for switching between multiple video sources output to output a video stream via a single physical output are disclosed. An example method can include decoding a first encoded video file and populating a memory with corresponding first decoded video data. The process can include decoding a second encoded video file and populating the memory with corresponding second decoded video data at a particular location of the memory. The process can include causing a video player to read from the memory so as to output a video stream, via the single physical output, corresponding to the first decoded video data, and then causing the video player to switch to read from the particular location of the memory such that the video stream switches to corresponding to the second decoded video data.

18 Claims, 5 Drawing Sheets

(56) References Cited

U.S. PATENT DOCUMENTS

2011/0280540 A1    11/2011  Woodman
2012/0063736 A1     3/2012  Simmons et al.
2013/0011121 A1*  1/2013  Forsyth ................ G11B 27/034
                                                              386/245
2013/0279877 A1    10/2013  Boak

OTHER PUBLICATIONS

Non-Final Office Action dated Oct. 21, 2014 for U.S. Appl. No. 13/838,990, filed Mar. 15, 2013.
Final Office Action dated May 19, 2015 for U.S. Appl. No. 13/838,990, filed Mar. 15, 2013.
Advisory Action dated Aug. 28, 2015 for U.S. Appl. No. 13/838,990, filed Mar. 15, 2013.
Hundemer, Hank J., U.S. Appl. No. 15/589,446, filed May 8, 2017.

* cited by examiner

SYSTEMS AND METHODS FOR SWITCHING BETWEEN MULTIPLE SOFTWARE VIDEO PLAYERS LINKED TO A SINGLE OUTPUT

RELATED DISCLOSURE

This disclosure is a continuation of U.S. patent application Ser. No. 13/839,273 filed on Mar. 15, 2013, and entitled "Systems and Methods for Switching Between Multiple Software Video Players Linked to a Single Output."

USAGE AND TERMINOLOGY

Throughout this application, with respect to all reasonable derivatives of such terms, and unless otherwise specified (and/or unless the particular context clearly dictates otherwise), each usage of:
- "a" or "an" is meant to read as "at least one."
- "the" is meant to read as "the at least one."
- "and" is meant to read as "and/or." That is, a reference to "A and B" includes only A, only B, or a combination of A and B.
- the term "video" refers to any material represented in a video format (i.e., having multiple frames). In some instances, video may include multiple sequential frames that are identical or nearly identical, and that may give the impression of a still image. Video may or may not include an audio portion.

TECHNICAL FIELD

The disclosed systems and methods relate generally to video playout, such as in connection with a news production system.

BACKGROUND

Unless otherwise indicated herein, the materials described in this section are not prior art to the claims in this disclosure and are not admitted to be prior art by inclusion in this section.

Video is made up of a sequence of images called frames, and perhaps associated audio. During playback, the sequence of frames can be displayed in succession, generally at a constant rate, together with the audio.

Digital video refers to video that is represented in a digital format. With digital video, each frame is a digital image. Each digital image is represented as a grid of pixels, each pixel having particular color values (such as RGB color values). A collection of digital video is often stored as a video file.

Encoding and compression techniques may be used to efficiently store digital video. According to some encoding standards, such as those specified by the Motion Picture Expert Group (MPEG), digital video may be stored as a series of reference frames and incremental frames, each representing a change relative to a corresponding reference frame. As a result, an encoded video file based on an MPEG standard typically begins with a reference frame, to allow subsequent incremental frames to be determined on the basis of the reference frame.

Television-broadcasting systems typically include a network of devices arranged to receive video from one or more of a variety of sources and output video to an air-chain system for broadcast (e.g., over the air according to a number of different standards). One such source can be a news production system (NPS) that may output a particular type of video, namely a news program which may be a combination of live or pre-recorded video, either of which may be dynamically modified with digital video effects (DVE).

An NPS can include a video playout module for playing pre-recorded video. Typically, pre-recorded video is stored as an encoded video file. As a result, a selected encoded video file can generally be played back, starting from an initial reference frame. Playback then ends either upon reaching a final frame of the encoded video file, or upon occurrence of some interruption event.

In preparing a news program for broadcast, a producer may select a sequence of particular encoded video files to be played in accordance with a schedule. In some cases, the producer may wish to include only a subset of a particular encoded video file, as opposed to the entire file. In such case, the producer may cause a second encoded video file to be generated, where the second video file is a subset of the first video file.

SUMMARY

In one aspect, a method involves: (i) decoding a first encoded video file to generate first decoded video data; (ii) populating a memory with the first decoded video data; (iii) causing a video player to read from the memory so as to output a video stream, via an output port, corresponding to the first decoded video data; (iv) decoding a second encoded video file to generate second decoded video data; (v) populating the memory with the second decoded video data at a particular location of the memory; and (vi) responsive to the video player outputting the video stream corresponding to the first decoded video data, causing the video player to read from the particular location of the memory such that the video stream output from the video player via the output port switches from corresponding to the first decoded video data to corresponding to the second decoded video data.

In another aspect, a method for operating a news production system having a video playout module is disclosed. The method involves: (i) the video playout module decoding a first encoded video file to generate first decoded video data; (ii) the video playout module populating a memory with the first decoded video data; (iii) the video playout module causing a video player to read from the memory so as to output a video stream, via an output port of the video playout module, corresponding to the first decoded video data; (iv) the video playout module decoding a second encoded video file to generate second decoded video data; (v) the video playout module populating the memory with the second decoded video data at a particular location of the memory; and (vi) responsive to the video player outputting the video stream corresponding to the first decoded video data, the video playout module causing the video player to read from the particular location of the memory such that the video stream output from the video player via the output port of the video playout module switches from corresponding to the first decoded video data to corresponding to the second decoded video data.

In another aspect, a system is disclosed. The system includes (i) a plurality of software video players each configured to retrieve encoded video files, generate corresponding decoded video data, and populate a memory with the decoded video data; (ii) a video playout card configured to read decoded video data from one of the plurality of software video players; and (iii) a control system configured to instruct the plurality of software video players to: (a) decode a first encoded video file to generate first decoded video data; (b) populate a memory with the first decoded video data; (c) cause the video playout card to read from the memory so as to output a video stream, via an output port of the video playout card, corresponding to the first decoded video data; (d) decode a second encoded video file to generate second decoded video data; (e) populate the memory with the second decoded video data at a particular location of the memory; and (f) responsive to the video playout card outputting the video stream corresponding to the first decoded video data, cause the video playout card to read from the particular location of the memory such that the video stream output from the video playout card via the output port of the video playout card switches from corresponding to the first decoded video data to corresponding to the second decoded video data.

In another aspect, a system is disclosed. The system includes (i) a plurality of software video players each configured to retrieve encoded video files, generate corresponding decoded video data, and populate a memory with the decoded video data; and (ii) a video playout card configured to read decoded video data from one of the plurality of software video players. The plurality of software video players can be configured to: (a) decode a first encoded video file to generate first decoded video data; (b) populate a memory with the first decoded video data; (c) cause the video playout card to read from the memory so as to output a video stream, via an output port of the video playout card, corresponding to the first decoded video data; (d) decode a second encoded video file to generate second decoded video data; (e) populate the memory with the second decoded video data at a particular location of the memory; and (f) responsive to the video playout card outputting the video stream corresponding to the first decoded video data, cause the video playout card to read from the particular location of the memory such that the video stream output from the video playout card via the output port of the video playout card switches from corresponding to the first decoded video data to corresponding to the second decoded video data.

These as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

Figure 1:
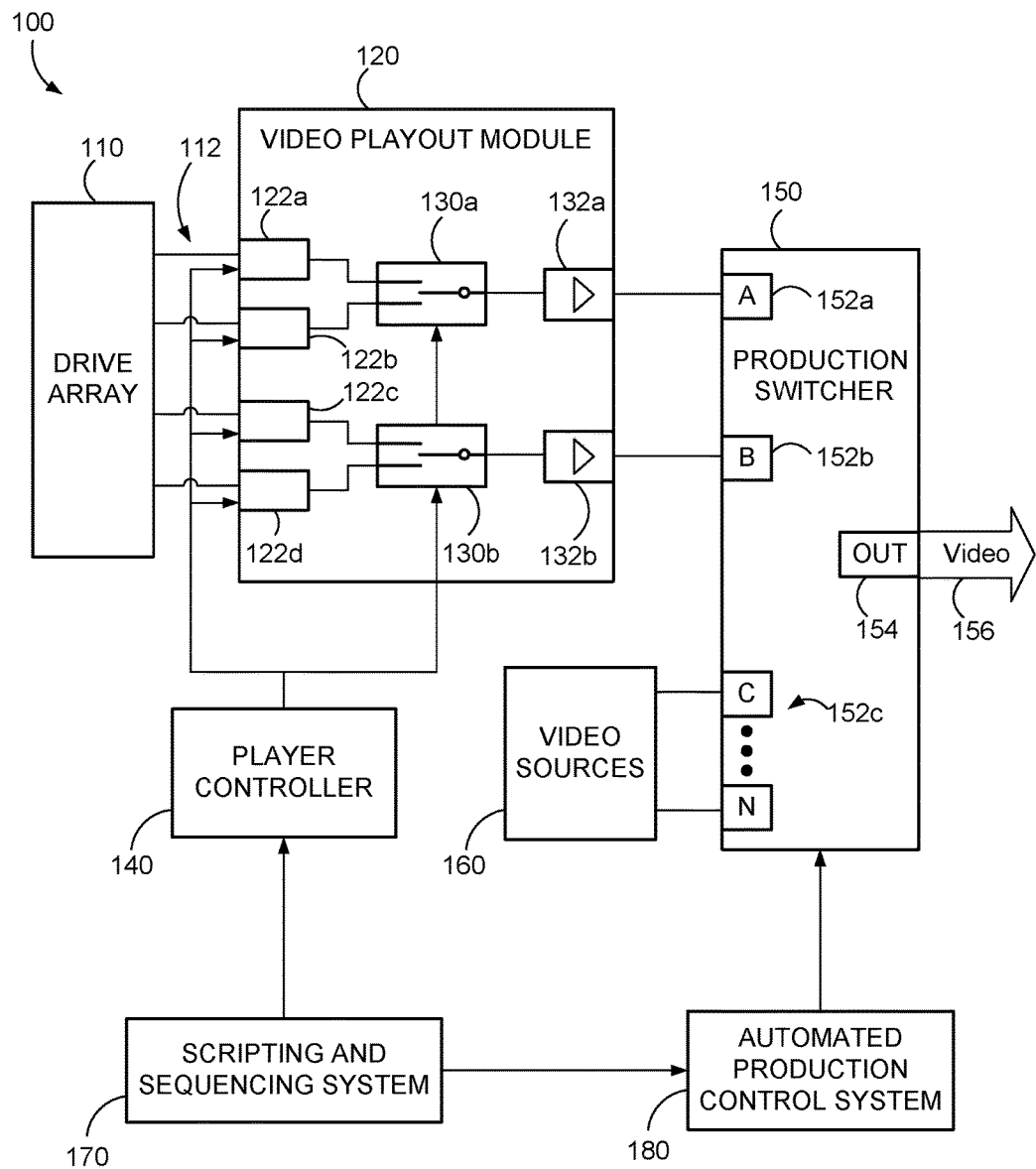
FIG. 1 is a simplified block diagram of an example news production system.

As noted above, an NPS may include a video playout module configured to playback a pre-recorded video stored as an encoded video file. The video playout module can include software video players, each of which can retrieve and decode the encoded video files to generate corresponding decoded video data. The software video player can then populate a buffer memory with the decoded video data, such that a video card can read the buffer memory and generate a video stream.

However, the process of the video playout module retrieving and decoding the encoded video files takes time. In particular, upon the video playout module receiving instructions to retrieve and decode a particular encoded video file, time passes while the software video player searches for the file, allocates memory for use as a buffer, decodes the file, and populates the allocated buffer memory with the resulting decoded video data.

For these and other reasons, some embodiments of the present disclosure provide for a video playout module that includes multiple software video players configured to operate in parallel, and that are linked to a single physical output. In particular, a first software video player can read and decode a first encoded video file, and populate a first buffer memory with the resulting decoded video data. A video card can then read the decoded video data corresponding to the first encoded video file from the first buffer memory. While the video card reads the decoded video data, a second software video player can operate in parallel to read and decode a second encoded video file, and populate a second buffer memory with the resulting decoded video data. A software-implemented switch can track pointers for the respective memory locations of the decoded video data corresponding to the first and second encoded video files, and can direct the video card to switch between the different locations to read decoded video data.

As a result, the video stream from the single physical output of the video card can be switched, in one frame's time, from providing video based on the first encoded video file to providing video based on the second encoded video file. For example, the output video stream can transition from a final frame of the first encoded video file immediately to an initial frame of the second encoded video file (i.e., without any intervening frames included in the video stream).

Moreover, some embodiments of the present disclosure allow for a software video player to play an encoded video file beginning from a designated frame location other than the initial frame of the encoded video file. In examples where an encoded video file is stored as a combination of reference frames and incremental frames, the software video player can scan the encoded video file to identify the designated frame. The software video player can then identify a nearest reference frame and decode the designated frame by first decoding the reference frame and then any intervening incremental frames, in order, to generate decoded video data for the designated frame. The software video player can then begin populating a buffer memory (to be read by a video card) with the decoded video data starting with the designated frame.

II. Example NPS

FIG. 1 is a simplified block diagram of an example NPS 100. The NPS 100 can be configured to perform a variety of functions related to producing a news program for television broadcast. Such functions may include retrieving and playing encoded video files. In some embodiments, the NPS 100 can output a video stream 156 that is generated from one or more video sources according to scripting and sequencing information. The video stream output from the NPS 100 can then be sent to a television-broadcasting system for broadcast. It is understood that the video stream 156 output from the NPS 100 can be subjected to additional processing, such as by modifying the video stream using DVEs prior to broadcast.

The NPS 100 can include a scripting and sequencing system 170, a player controller 140, a video playout module 120, a drive array 110, a production switcher 150, other video sources 160, and an automated production control system (APCS) 180. The scripting and sequencing system 170 specifies an ordering of encoded video files to be decoded and output to the production switcher 150 at particular times. The scripting and sequencing system 170 instructs the player controller 140, which in turn instructs the video playout module 120 to retrieve and decode particular encoded video files stored in the drive array 110. The video playout module 120 provides to the production switcher 150, a video stream generated from the one or more encoded video files. Additional video sources 160 also provide video streams to the production switcher 150. The APCS 180 instructs the production switcher 150 to provide an output video stream 156 by switching between and/or combining the various incoming video streams over time according to a schedule specified by the scripting and sequencing system 170. The output video stream 156 is thus the output of the NPS 100.

A. Scripting and Sequencing System

The scripting and sequencing system 170 may provide an interface for a producer to create a news program. For instance, based on input received from the producer, the scripting and sequencing system 170 may specify a sequence of live video and/or pre-recorded video. The pre-recorded video may be stored as encoded video files on the drive array 110. Moreover, in some examples, the scripting and sequencing system 170 may allow for specifying a particular subset of a given encoded video file (e.g., with a start frame and an end frame).

The schedule provided by the scripting and sequencing system 170 is used by both the player controller 140 and the APCS 180, which in turn operate the video playout module 120 and the production switcher 150, respectively, to facilitate generation of the output video stream 156. When the NPS produces a news program, the scripting and sequencing system 170 may be operated in a manual, automatic, or combined mode.

In the manual mode, a user can input commands to an interface of the scripting and sequencing system 170 in real time, or nearly in real time, to cause the scripting and sequencing system 170 to undertake a variety of operations for generating an output video stream.

In the automatic mode, the scripting and sequencing system 170 can provide instructions (e.g., control or command instructions) to the player controller 140 and APCS 180 according to a schedule to cause the output video stream 156 to be generated without input from a user.

The combined mode may combine aspects of the manual and automatic modes. For example, the scripting and schedule system 170 may prompt the user with suggested blocks or routines of instructions that are suggested at least in part on the basis of historical usage patterns or the current operation. In some examples, the scripting and sequencing system 170 can be operated in an automatic mode by default, but a user can switch to operating in the manual or combined mode as desired (e.g., in order to make corrections or to interrupt the schedule for breaking news).

In addition to specifying a schedule, the scripting and sequencing system 170 can specify scripted processes associated with the news program. For example, the scripting and sequencing system 170 may specify maneuvers carried out by one or more lighting systems to create lighting conditions suitable for particular live video segments scheduled by the scripting and sequencing system 170. As will be appreciated, the scripting and sequencing system 170 may also control other systems included in or related to the NPS 100.

B. Player Controller

The player controller 140 receives instructions from the scripting and sequencing system 170 indicating the series of encoded video files to be played by the video playout module 120. Accordingly, the player controller 140 instructs the video playout module 120 to retrieve and decode particular encoded video files from the drive array 110. As described further below, the player controller 140 instructs the video playout module 120 to provide video streams of decoded video data from particular output ports of the video playout cards 132*a-b* of the video playout module 120 at particular times. When controlling the video playout module 120, the player controller 140 may account for buffering and other delays associated with the video playout module 120 retrieving and decoding encoded video files. Moreover, the player controller 140 can communicate with the scripting and sequencing system 170 to indicate the particular video playout cards 132 that will be used to provide the requested video streams. The scripting and sequencing system 170 may then, in turn inform the APCS 180 of the order of video playout cards 132, to allow the APCS 180 to instruct the production switcher 150 accordingly.

C. Video Playout Module

As noted above, the video playout module 120 operates according to instructions received from the player controller 140 to retrieve and decode encoded video files on the drive array 110, and provide a corresponding output video stream via the video player cards 132. The video playout module 120 can include multiple software video players 122*a-d*, and each may be configured to retrieve and decode encoded video files (or portions thereof). The software video players 122 are referred to hereafter as players 122.

Each of the players 122 can be configured to communicate with the drive array 110 via communication interface 112 to read a specified encoded video file stored on the drive array 110. The communication interface 112 can include, for example, one or more Ethernet interfaces, which may be arranged in a redundant (e.g., bonded) configuration to increase the bandwidth of such communication.

The players 122 can be configured such that in response to receiving instructions from the player controller 140, the players 122 scan the drive array 110 for a specified encoded video file, allocate a block of memory to be used as a buffer, generate decoded video data based on the file, and populate the allocated memory with the decoded video data. Software switches 130*a-b* can selectively direct the decoded video data generated by the players 122 to be passed to the video playout cards 132*a-b*. The video playout cards 132 include output ports, which are connected to corresponding inputs 152*a-b* of the production switcher 150.

According to some embodiments, multiple players 122 can be associated with each video playout card 132. The video playout module 120 can be arranged with the first and second players 122*a-b* each associated with the first video playout card 132*a*. As such, the first video playout card 132*a* can receive, at any given time, decoded video data generated by one of the players 122*a-b*. A first software switch 130*a* operates to channel the decoded video data from one or the other of the two players 122*a-b* to the video playout card 132*a* at given times as specified by instructions from the player controller 140. Similarly, the third and fourth players 122c-d can each be associated with the second video playout card 132b. A second software switch 130b can selectively channel the decoded video data from one or the other of the two players 122c-d to the video playout card 132b as specified by instructions from the player controller 140.

The video playout module 120 is one illustrative example. However, it is noted that some embodiments of the present disclosure can include video playout modules 120 with different numbers of software video players, such as more than or less than four players (e.g., six players), and with different numbers of video playout cards, such as more than or less than two video playout cards (e.g., three video playout cards). Moreover, some embodiments of the present disclosure may include a group of more than two players associated with a single video playout card, such as a group with players numbering three, four, etc. In such an example, a software switch can operate according to instructions from the player controller 140 to specify a particular one of the players in the group to channel decoded video data to the group-associated video playout card at any given time.

D. Drive Array

The drive array 110 can include one or more computer-readable media for storing digital files. The drive array 110 may therefore include optical and/or magnetic storage media and/or additional non-tangible media suitable for retrievably storing digital information. In some examples, the drive array 110 can include an array of disk drives that store information in a redundant configuration to provide data security. Moreover, the drive array 110 can be arranged with information stripped across multiple drives to enable write/read operations to be carried out in parallel to/from the multiple drives. For example, the drive array 110 may employ configurations for various levels of a redundant array of independent disks (RAID).

E. Production Switcher

The production switcher 150 receives video streams from the video playout module 120 via inputs 152a-b. The production switcher 150 may also receive input video streams from other video sources 160 (discussed further below) such as at corresponding input 152c. The production switcher 150 also includes an output port 154, from which the output video stream 156 is provided. The production switcher 150 receives instructions from the APCS 180 to indicate which of the inputs 152a-c should be used to create the output video stream 156.

The production switcher 150 may, for example, provide the output video stream 156 by switching between the video streams from different ones of the inputs 152a-c. Additionally or alternatively, the production switcher 150 can run a DVE that overlays an effect and/or that combines the video streams from multiple inputs 152a-c to create the output stream 156. For example, the resulting output video stream 156 may then include live video of a news anchor discussing a news story while video related to that news story plays in a box over the news anchor's shoulder.

F. Other Video Sources

In addition to the video playout module 120 providing video streams of encoded video files stored on the drive array 110, the NPS 100 may also include other video sources 160 that provide video streams to the production switcher 150. Such other video sources 160 may provide pre-recorded video or live video. Live video may be sourced remotely (e.g., provided via satellite communication or other communication interface) and/or locally (e.g., from a production studio).

G. APCS

The APCS 180 determines which particular inputs 152a-c the production switcher 150 should use, at any given time, to generate the output video stream 156 via the output port 154. The APCS 180 determines which of the inputs 152a-c are providing input video streams to be included (or otherwise used) in the output video stream 156 according to information from the scripting and sequencing system 170, which specifies a schedule of video content that makes up the output video stream 156. Additionally, the APCS 180 may receive feedback from the player controller 140 indicating which of the particular inputs 152a-b are providing particular video streams at given times, and such feedback may provide an additional basis for instructing the production switcher 150 An example of an APCS is OverDrive provided by Ross Video of Ottawa, Canada.

III. Example Video Playout Module

Figure 2:
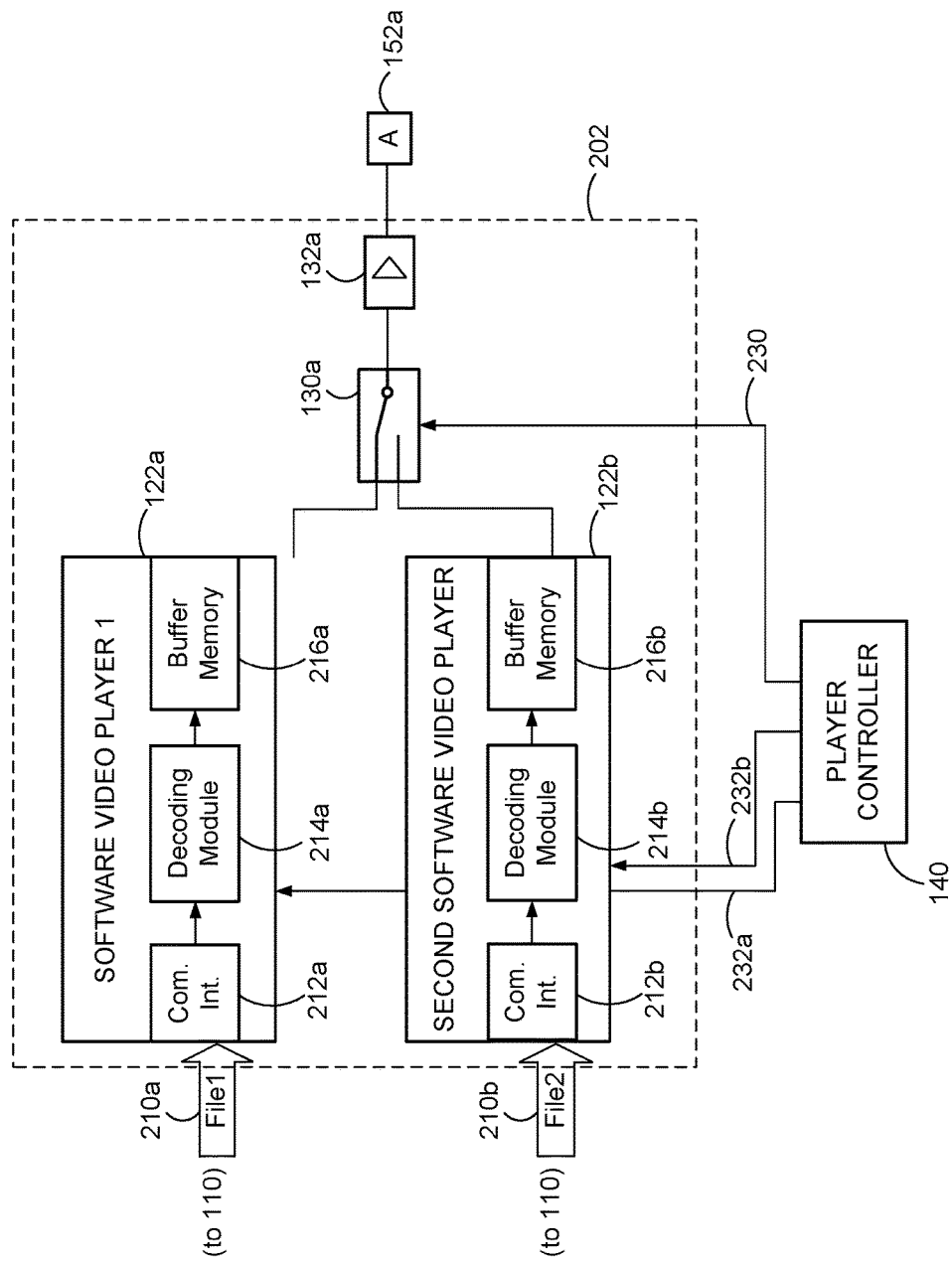
FIG. 2 is a simplified block diagram of a portion of a video playout module.

FIG. 2 is a simplified block diagram of a portion 202 of the video playout module 120. Components included in the video playout module 120 are indicated by inclusion in the dashed box, generally referred to by the reference number 202. In particular, the portion 202 includes the first and second players 122a-b, the software switch 130a, and the video playout card 132a. The players 122a-b can include hardware, software and/or firmware implemented modules configured to communicate with the drive array 110, process encoded video files, and populate a buffer memory with resulting decoded video data. To carry out these functions, each of the players 122a-b can include a respective communication interface 212a-b, a respective decoding module 214a-b, and a respective buffer memory 216a-b, as described below.

A. Communication Interface

The first player 122a can include a communication interface 212a, which can be configured to communicate with the drive array 110 to read encoded video files stored on the drive array 110. Similarly, the second player 122b can include a communication interface 212b configured in the same manner. In addition, the communication interface 212a-b may be configured to communicate with the player controller 140 to receive respective instructions 232a-b for operating the respective players 122a-b. The communication interface 212 may use Ethernet connection and/or bonded Ethernet connection and can optionally be shared between multiple ones of the players 122.

As shown in FIG. 2, the first player 122a can read an encoded video file "file1" 210a from the drive array 110, and the second player 122b can read an encoded video file "file2" 210b from the drive array 110 via the communication interfaces 212a-b, respectively. The particular files (e.g., file1 210a and file2 210b) can be specified by the instructions 232a-b conveyed to the respective players 210a-b from the player controller 140, which in turn is instructed by the scripting and sequencing system 170.

B. Decoding Module

The first player 122a can also include a first decoding module 214a, which operates to generate decoded video data from corresponding encoded video files accessed via the communication interface 212a. Similarly, the second player 122b can include a second decoding module 214b, which operates similarly to generate decoded video data. The decoding module 214 may therefore include a set of computer-readable instructions or other program logic that is executable by one or more computing devices (e.g., a processor) to read an encoded video file, via the respective communication interface 212*a-b*, and generate decoded video data. The functions carried out by the decoding module 214 may be performed by executing such instructions on one or more general purpose and/or special purpose processors included in the video playout module 120. For instance, one or more video processors or other special purpose processors included in the video playout module 120 may be used by the decoding module 214. Moreover, the video playout module 120 may include one or more multi-threaded processors, which may be shared between multiple players 122 by, for example, different players 122 operating on different threads.

C. Buffer Memory

The first player 122*a* can also include a first buffer memory 216*a*; and the second player 122*b* can include a second buffer memory 216*b*. The buffer memory 216 may include a volatile (e.g. RAM) or non-volatile (e.g., ROM) data storage system readable by the video playout card 132*a*. The first buffer memory 216*a* can be populated with decoded video data generated by the decoding module 214*a*. When directed by the software switch 130*a*, the video playout card 132*a* can read the decoded video data from the buffer memory 216*a*. The video playout card 132*b* can also read the decoded video data from the buffer memory 216*b* in a similar manner. As the video playout card 132*a* reads decoded video data from one of the buffer memories 216*a-b*, the respective player 122*a-b* can generate decoded video data for subsequent frames of the respective encoded video files 210*a-b* and populate the "read" portions of the respective buffer memory 216*a-b* with such subsequently generated decoded video data.

The buffer memory 216 may include a block of memory that is dynamically allocated by a corresponding player 122*a-b*. Additionally or alternatively, the buffer memory 216 may include dedicated memory associated with a special purpose processor, such as a video processor or other digital signal processor. Moreover, the buffer memory 216 may be shared between multiple ones of the players 122.

In one example, the buffer memory 216 may have sufficient capacity to store a decoded video data stream of a portion, but not the entire video file 210. Once the video playout card 132*a* begins reading from the buffer memory 216, the respective player 122 can therefore generate decoded video data for subsequent frames of the respective encoded video file 210 on an ongoing basis and populate such subsequently decoded video data in the respective buffer memory 216. The subsequently decoded video data populates the buffer memory 216 so as to replace data most recently read by the video playout card 132*a*. In one example, the buffer memory 216 may have sufficient capacity to store approximately 0.1 to 0.5 seconds of decoded video data, when such decoded video data is streamed according to a given video format. Thus, the buffer memory 216 may have sufficient capacity to store, for example, 3 to 15 frames of decoded video data. The buffer memory 216 may be about 64 megabytes (MB), although some embodiments may use buffer memories of other capacities greater or lesser than 64 MB, such as 32 MB, 128 MB, and/or other capacities.

The buffer memory 216 can thus provide a margin between generating decoded video data by the respective player 122 and reading the video data with the video playout card 132*a*. The buffer memory 216 thereby operates to ensure the video playout card 132*a* has a stream of decoded video data continuously ready to read. In particular, the buffer memory 216 may be helpful in circumstances where the respective decoding module 214 generates decoded video data at a variable rate based on currently available processor resources (e.g., as dictated by an operating system), and the video playout card 132 reads the generated decoded video data at a roughly constant rate (e.g., according to the bit rate of the output video stream). The buffer memory 216 helps the respective decoding module 214 stay ahead of the video player card 132*a*, even if the respective decoding module 214 occasionally and momentarily generates decoded video data at a lower rate than the video player card 132*a* reads such data from the respective buffer memory 216.

D. Video Playout Card

The video playout card 132*a* is configured to read decoded video data from the buffer memory 216 and output a stream of video data to the production switcher 150 that is based on the decoded video data. The video playout card 132*a* can read decoded video data from either of the buffer memories 216*a* or 216*b*, as directed by the software switch 130*a*. The video playout card 132*a* can also include an output port for conveying the resulting stream of video data to the input port 152*a* of the production switcher 150.

The video playout card 132*a* may include an arrangement of receivers, filters, amplifiers, and/or other digital signal conditioning sub-systems to provide a video stream in accordance with any number of different video formats and/or standards. Additionally or alternatively, the video playout card 132*a* may include one or more software and/or firmware implemented modules for carrying out digital signal processing functions.

E. Software Switch

The software switch 130*a* is configured to selectively connect the video playout card 132*a* to one of the buffer memories 216*a* or 216*b* at given times specified by instructions 230 from the player controller 140. The instructions 232 may specify which of the two players 122*a-b* to connect to the video playout card 132*a* at any given time, for example. The software switch 130*a* thereby controls which one of the decoded video data streams generated by the two software video players 122*a-b* are output via the video playout card 132*a*, and thus to the input port 152*a* of the production switcher 150.

As discussed further below, the software switch 130*a* may operate by identifying a memory pointer for each of the two buffer memories 216*a-b*, and directing the video playout card 132*a* to read from one of the two pointer locations. In some examples, such pointers may be updated on an ongoing basis by the software switch 130*a* or another component to reflect the most recently read decoded video data by the video playout card 132*a*.

In some examples, the software switch 130*a* can be operated to switch the video playout card 132*a* between the players 122 such that the resulting video stream from the video playout card 132*a* switches substantially immediately between encoded video files. For example, the resulting video stream can switch from a final frame of file1 210*a* immediately to an initial frame of file2 210*b* with no intervening frames. As such, the software switch 130*a* can operate on a sufficiently short timescale (e.g., a duration less than a time in which a frame is output from the video playout card 132*a* according to a given video format), such that the video stream output from the video playout card 132*a* can be switched from a final frame of decoded video data generated by the first software video player 122*a*, to a first frame of decoded video data generated by the second software video player 122*b*. As a result, the production switcher 150 can receive a continuous stream of decoded video data via the single input port 152 which transitions between two different encoded video files at a particular frame time as specified by the player controller 140, which is in turn instructed according to the scripting and sequencing system 170.

IV. Example Decoding Operation

The players 122 can receive instructions 232 from the player controller 140. The instructions 232a provided to the first player 122a can specify a particular encoded video file (e.g., file1 210a) on the drive array 110. The first player 122a can then communicate with the drive array 110, via the communication interface 212a, to read the specified file. In some embodiments, the first player 122a can also communicate with an operating system to allocate a block of memory to be used as the buffer memory 216a. The first player 122a can then read file1 210a on the drive array 110, and begin generating decoded video data and populating the buffer memory 216a with the decoded video data. The second player 122b can operate in a similarly manner according to instructions 234b from the player controller 140 to communicate with the drive array 110, via the communication interface 212b, to read file2 210b, and begin generating decoded video data and populating the buffer memory 216b with the decoded video data.

A. Encoded Video File

The encoded video file 210 may be stored in an encoded video file format such as MPEG-2 or MPEG-4, for example. Moreover, the encoded video file 210 may be stored in a compressed format, which compression may be carried out according to a lossy compression algorithm to represent video according to spatial frequency content of the frames and/or according to temporal frequency content of a sequence of such frames. In some examples, the encoded video file 210 may include reference frames (e.g., I-frames) and incremental frames (e.g., P-frames, B-frames) that specify changes relative to a corresponding reference frame.

The reference frames can specify full values for a single frame (e.g., 10-bit color values for rows and columns of a particular frame), and can be decoded independently of all other frames in the encoded video file. By contrast, the incremental frames can specify image content according to, for example, the relative differences in spatial frequency color content across the image (e.g., according to a Fourier-based decomposition of the frame content, relative to one or more frames). Thus, an incremental frame in such an encoded video file cannot generally be independently decoded, without decoding the nearest reference frame (perhaps the nearest preceding reference frame) and then decoding each intervening frame to eventually decode the particular incremental frame.

In such a scheme, the amount of data compression of a particular encoded video file may specify the relative number of reference frames versus incremental frames, and may also influence the fineness and/or precision of each incremental frame. Encoded video files using a high compression scheme (so as to provide a smaller file size) may employ relatively few reference frames and/or may define incremental frames by approximations based on relatively few Fourier-based spatial frequency components. On the other hand, encoded video files using a low compression scheme (so as to provide a relatively larger file size) may employ a relatively greater number of reference frames and/or may define incremental frames by approximations based on relatively higher order Fourier-based spatial frequency components.

B. Start Frames and End Frames

In addition to specifying an encoded video file, the instructions 232 can specify a start frame and/or end frame of the encoded video file 210. Generally, the encoded video file is defined, at least in part, by an initial frame and a final frame. The start frame and/or end frame can be used to cause the players 122 to decode and play a subset of an encoded video file, which may begin at a location other than the initial frame and end at a location other than the final frame of the encoded video file. Such a subset of the encoded video file 210 is referred to generally herein as a video clip.

The player 122 can then begin generating decoded video data from the specified start frame, rather than from the initial frame of the encoded video file 210. However, in cases where the encoded video file 210 includes incremental frames as described above, generating a stream of decoded video data beginning with the specified start frame may include scanning the file 210 to locate the nearest reference frame to the specified start frame, decoding any intervening frames in order to account for each incrementally defined change relative to the reference frame, and decoding the start frame. The decoding module 214 of the first player 122a may therefore be configured to populate the buffer memory 216 with decoded video data from the specified start frame onwards.

Alternatively, the decoding module 214 of the first player 122a may populate the buffer memory 216 with decoded video data from the nearest preceding reference frame through the start frame. In this example, the decoding module 214 can set a read out location of the start frame in order to skip playout of decoded frames that precede the start frame.

C. Decoded Video Data

The decoded video data generated by the player 122 can be in an uncompressed format (e.g., HD-SDI) suitable to be received by a television-broadcasting system. The decoded video data stream generated by the player 122 generally has a higher bit rate than the corresponding encoded video file 210 stored on the drive array 110. For example, the player 122 may receive a compressed MPEG-2 video file at 25 mega-bits per second (Mbps), and then may generate a corresponding stream of decoded video data at 1.485 giga-bits per second (Gbps).

D. Example Data Flow

Figure 3:
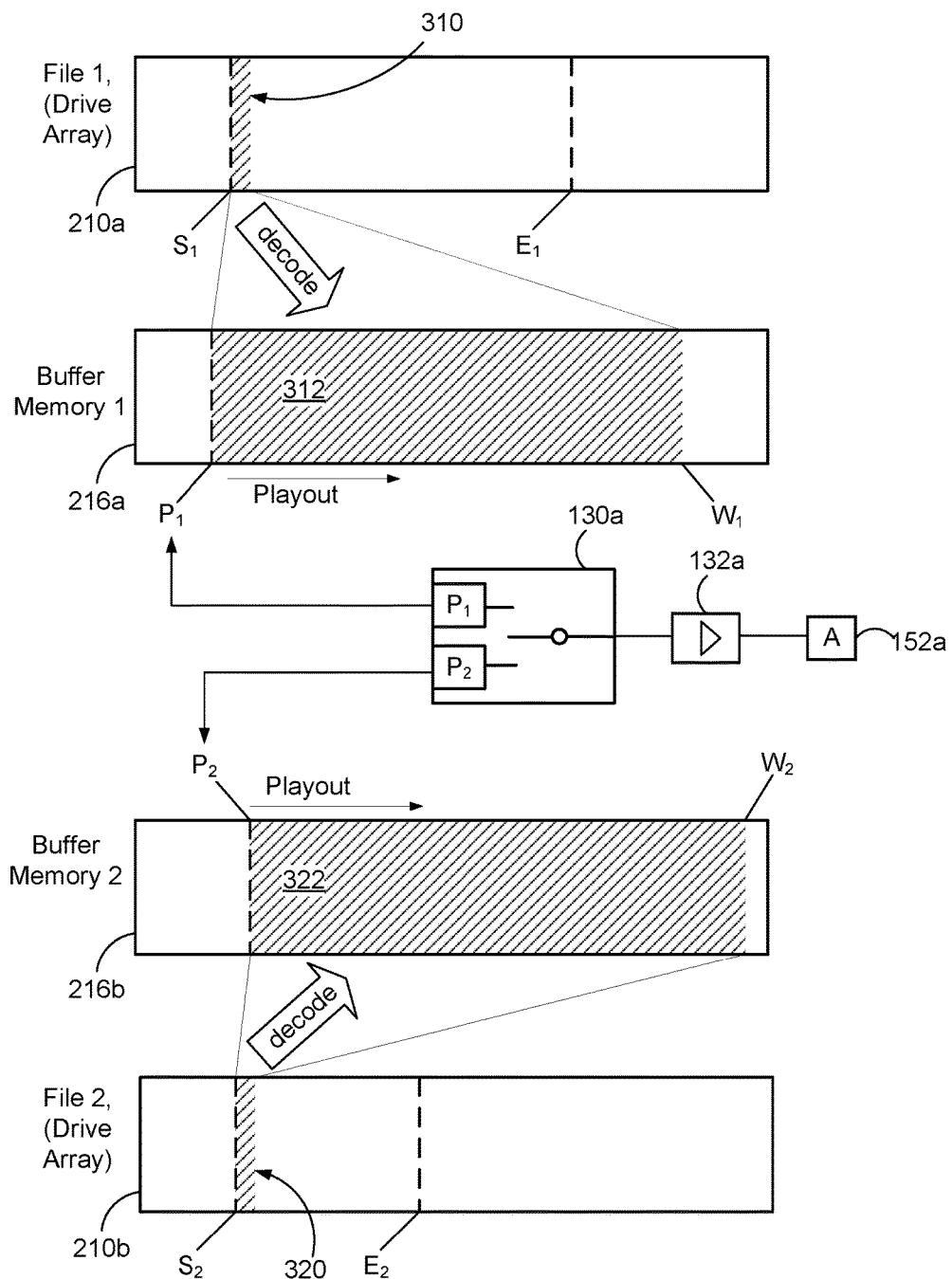
FIG. 3 is a simplified block diagram of data flow from multiple software video players to a single video output port, according to an example embodiment.

FIG. 3 is a simplified block diagram of data flow from multiple software video players to a single video output port, according to an example embodiment. For convenience in explanation the example data flow shown in FIG. 3 is described by way of example with reference to the various functional modules described in connection with FIGS. 1 and 2 above.

The scripting and sequencing system 170 may specify a schedule of video to be played out, and the scripting and sequencing system 170 can then instruct the player controller 140 to prepare the players 122 to generate suitable streams of video to the production switcher 150. For example, scripting and sequencing system 170 may schedule a first video clip from file1 210a, played from start frame $S_1$ to end frame $E_1$, immediately followed by a second video clip from file2 210b, played from start frame $S_2$ to end frame $E_2$.

The player controller 140 can then send instructions 232a to the first player 122 specifying file1 210a, $S_1$, and $E_1$. In response, the first player 122a can communicate with the drive array 110 to read file1 210a, and scan through file1 210a to locate the start frame $S_1$. The player 122a may, for example, scan through header information associated with file1 210a to approximate the nearest reference frame and then begin decoding file1 210a from the nearest estimated reference frame, and also decode any intervening reference frames as necessary to reach the specified start frame $S_1$. If necessary, the first player 210a can also request an allocation of memory for the buffer memory 216a (e.g., from an operating system). Alternatively, the scripting and sequencing system 170 may schedule files without specifying starting and ending frames. In this case, the initial and final frames of a file may be used as the starting and ending frames, respectively. In some examples, an interruption event (e.g., caused by a user) may be used to trigger the end of the playout of a file.

Once the start frame $S_1$ is located, an initial block 310 of the encoded video file 210a beginning with frame $S_1$ can be decoded by the decoding module 214a of the first player 122a. Decoding the initial block 310 results in a corresponding initial block 312 of decoded video data, which is populated in at least a portion of the buffer memory 216a. As described above, alternatively, the decoding module 214a may populate the buffer memory 216a with decoded video data from the nearest preceding reference frame through the start frame. In either case, the player 122a can use a write out pointer indicated as $W_1$ that identifies the current write out location of the decoded video data (i.e., the most recently decoded frame) at a given time. In addition, the player 122 can use a playout pointer indicated as $P_1$ that identifies the current playout location of the decoded video data (i.e., the next frame cued for playout) at a given time. Upon either of the pointers reaching the end of the buffer memory 132a, the pointer can "loop" and be directed back to the beginning of the buffer memory 132a. Note that FIG. 3 shows the pointers $P_1$ and $W_1$ at a particular time as the block 310 is being decoded. However, as additional encoded video is decoded, the pointer $W_1$ can continue to advance (eventually looping around), at least until it immediately precedes the pointer $P_1$. In this instance, the pointer $W_1$ does not advance until the pointer $P_1$ advances (i.e., to avoid overwriting decoded video data that has not yet been played out), which may be indicated by a software interrupt.

The pointer $P_1$ can be used by the software switch 130a to refer the video playout card 132a to the particular memory location in the buffer memory 216a from which to read and playout the decoded video data. At this point, the first player 122a is ready for the video playout card 132a to begin reading and playing out the block 312 of decoded video data.

As noted above, once the video playout card 132a begins reading and playing out the block 312 of decoded video data, the first player 122a can continue with generating decoded video data for subsequent frames of file1 210a. Once decoded video data stored in the buffer memory 216a is read and played out by the video playout card 132a, the portion of the buffer memory 216a that stored the read data is made available again to be populated with subsequently decoded video data. The decoded video data for subsequent portions of file1 210a is populated in the next available allocated portion of the buffer memory 216a to allow the playout video card 132a to continuously loop through the buffer memory 216a. This allows the entire buffer memory 132 to be cyclically re-used to buffer the decoded video data as it is read and played out by the video playout card 132a.

The software switch 130a and/or the first player 122a may track such pointers to ensure that decoded video data does not over-write decoded video data that is yet to be read and played out by the video playout card 132a. Moreover, the software switch 130a and/or the player 122a can be configured to signal the end of the video clip when the playout pointer $P_1$ and the write in pointer $W_1$ refer to the same location. Such a condition may indicate, for example, that the specified video clip played to the end of the available decoded video data, and so the playout pointer $P_1$ "caught up" to the final write in pointer $W_1$ (e.g., at the location corresponding to the end frame $E_1$).

While the first player 122a prepares the decoded video data corresponding to file1 210a from start frame S1 to end frame E1 as described above, the player controller 140 can also send instructions 232a to the second player 122b. The instructions 232b sent to the second player 122b can specify the encoded video file file2 210b, $S_2$, and $E_2$. In response, the second player 122b can operate to read file2 210b from the drive array 110, and scan file2 210b to locate the start frame $S_2$. If necessary, the second player 210b can also request an allocation of memory for the buffer memory 216b (e.g., from an operating system).

Once the start frame $S_2$ is located, an initial block 320 of the encoded video file 210b beginning with frame $S_2$ can be decoded by the decoding module 214b of the second software player 122b. As discussed above, the initial decoding may include decoding a closest identified reference frame to the start frame $S_2$, and any intervening incremental frames. Decoding the initial block 320 of file2 210b results in a corresponding initial block 322 of decoded video data, which is populated in at least a portion of the buffer memory 216b. As with the first player 122a, the second player 122b may use a playout pointer $P_2$ and a write in pointer $W_2$. The pointer $P_2$ can then be used by the software switch 130a to refer the video playout card 132a to the particular memory location in the buffer memory 216b from which to read and playout the decoded video data. At this point, the second player 122b is ready for the video playout card 132a to begin reading and playing out the block 322 of decoded video data.

Once the video playout card 132a begins reading and playing out the decoded video data 312, the second player 122b can continue with generating decoded video data for subsequent frames of file2 210b. Once decoded video data stored in the buffer memory 216b is read and played out by the video playout card 132a, the portion of the buffer memory 216b that stored that data is made available again to be populated with subsequently decoded video data. The decoded video data for subsequent portions of file2 210b is populated in the next available allocated portion of the buffer memory 216b to allow the playout video card 132b to continuously loop through the buffer memory 216b. Similar to the discussion of with respect to the buffer memory 216a, the pointers $P_2$ and $W_2$ can be used by the software switch 130a and/or the second player 122b to ensure that decoded video data does not overwrite data that is not yet read and played out by the video playout card 132b and also to identify the end of the specified video clip, such as occurs when the two pointers refer to the same location.

The software switch 130a operates according to instructions 230 received from the player controller 140, which may instruct the software switch 130a to direct the video playout card 132a to read from the first player 122a while the first clip is played (e.g., file1 210a from frames $S_1$ to $E_1$), and to read from the second player 122b while the second clip is played (e.g., file2 210b from frames $S_2$ to $E_2$). Thus, the software switch 130a may direct the video playout card 132a to read from the buffer memory 216a at a read location specified by pointer $P_1$ while the first clip plays, and then immediately direct the video playout card 132a to read from the buffer memory 216b (as specified by pointer $P_2$). The resulting video stream from the video playout card 132a (which is then provided to the input port 152a of the production switcher 150) therefore concatenates the two video clips together one after another. For example, the output video stream may transition from a final frame of file1 210a (i.e., the frame $E_1$) to the initial frame of file2 210b (i.e., the frame S1) with no intervening frames in the output video stream. This may be particularly advantageous in connection with a NPS where it may be desired to playout video in accordance with strict timing requirements. However, it should be noted that the players 122 may be useful in connection with other video-related systems.

While the above description is provided in reference to two of the players 122 used to generate an output video stream that concatenates two video clips from a single output port of the playout card 132a, it is noted that the above systems and techniques can be used to combine multiple such video clips in accordance with directions from the scripting and sequencing system 170. For instance, upon the video playout card 132a beginning to read decoded video data from the buffer memory 216b (and thus ceasing to read from the buffer memory 216a), the player controller 140 may instruct the first player 122a to retrieve and decode yet another video clip stored on the drive array 110 (e.g., file3 from start frame $S_3$ to end frame $E_3$). Upon the video playout card 132a reaching the end of the second video clip, then, the software switch 130a may direct the video playout card 132a to switch to read from a location of the buffer memory 216a which has been populated with decoded video data for the additional video clip.

Furthermore, the NPS system 100 may further allow for outputting subsequently scheduled video clips from the output port associated with the video playout card 132b, via one or both of the players 122c-d. The video playout card 132b is in turn connected to the input port 152b of the production switcher 150. Thus, the APCS 180 can instruct the production switcher 150 which of the inputs 152a-c are receiving input at various times, and the APCS 180 can in turn determine which of the input ports 152a-b to use based on feedback from the player controller 140 and/or scripting and sequencing system 170.

V. Example Operation

Figure 4:
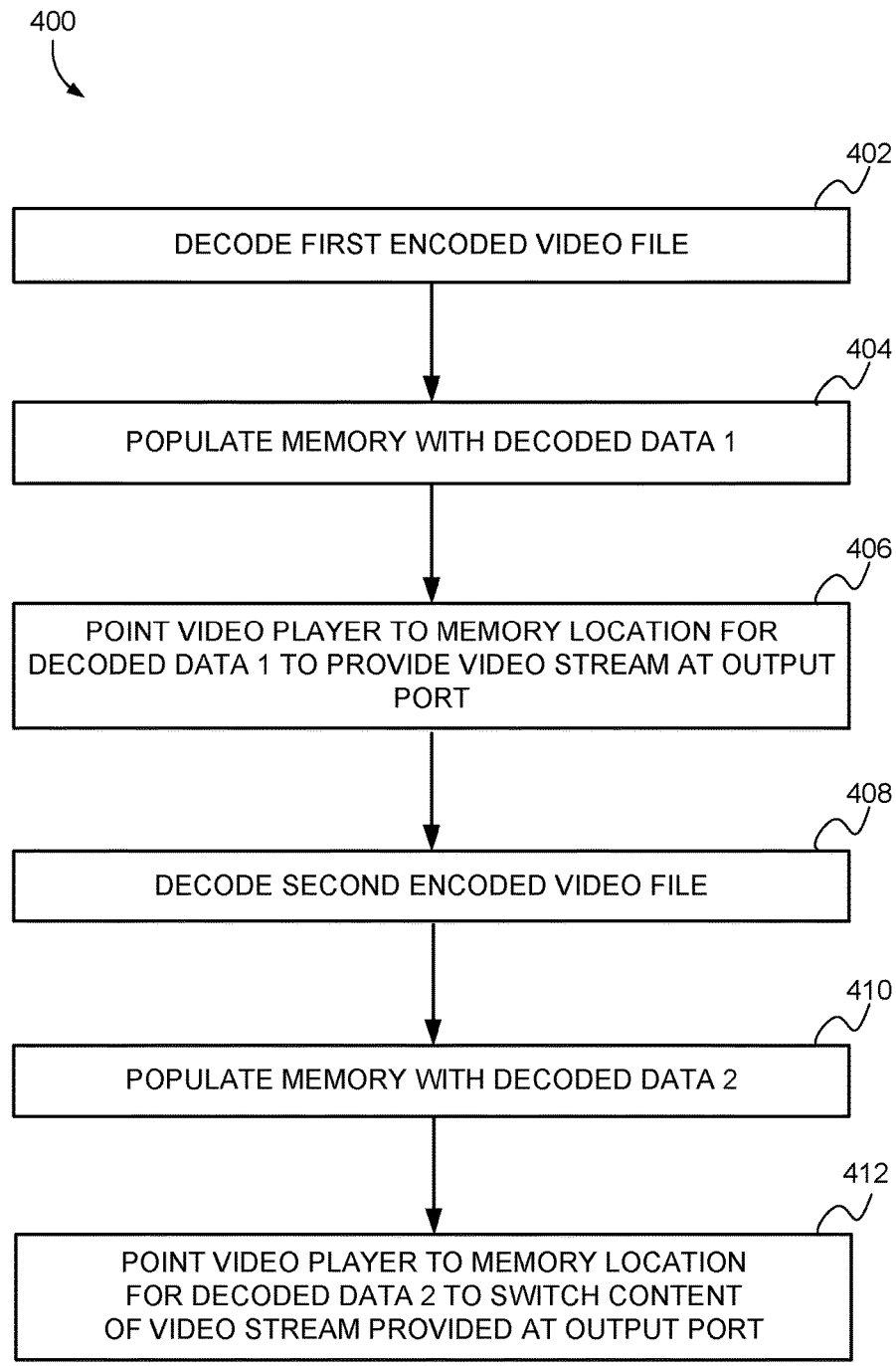
FIG. 4 is a flowchart of an example process that may be performed by the news production system.

FIG. 4 is a flowchart of an example process 400 that may be performed by the NPS 100 and/or sub-systems thereof. In some examples, the process 400 is performed by the video playout module 120 alone or in combination with other systems in the NPS 100. At block 402, the first player 122a can read a first encoded video file (e.g., file1 210a) and generate corresponding first decoded video data. As discussed above in connection with FIGS. 1-3, the first player 122a may read the first encoded video file from the drive array 110, via the communication interface 212a, and may generate corresponding first decoded video data, via the decoding module 214a.

At block 404, the first player 122a can populate a memory such as the first buffer memory 216a with the generated first decoded video data. In some embodiments, the first player 122a may also function to allocate a block of memory for use as the first buffer memory 216a, such as by requesting an allocation of memory resources from an operating system. Following block 404, the first player 122a is ready (i.e., cued) for the decoded video data to be read from the buffer memory 216a, as discussed by way of example in connection with FIG. 3 above.

At block 406, the video playout card 132a can read from the buffer memory 216a so as to generate a video stream corresponding to (at least a portion of) the decoded video data loaded in the buffer memory 216a. The video stream can be provided from an output port of the video playout card 132a, for example. In some examples, the software switch 130a directs the video playout card 132a to read from the buffer memory 216a.

Moreover, as discussed in connection with FIG. 3 above, the software switch 130a and/or the player 122a can user pointers to track the current playout location and the current write in location of the decoded video data in the buffer memory 216a. Upon portions of the first decoded video data in the buffer memory 216a being read and played out by the video player card 132a, those portions can be made available to the player 122a for populating with decoded video data for subsequent frames of the first encoded video file (i.e., filet 210a). As such, the video playout card 132a can cycle through the buffer memory 216a on an ongoing basis to read dynamically generated decoded video data provided by the player 122a.

At block 408, the second player 122b can read a second encoded video file (e.g., file2 210b) and generate corresponding second decoded video data. As discussed above in connection with FIGS. 1-3, the second player 122b may read the second encoded video file from the drive array 110, via the communication interface 212b, and may generate corresponding second decoded video data, via the decoding module 214b.

At block 410, the second player 122b can populate a memory such as the buffer memory 216b with the generated second decoded video data. In some embodiments, the second player 122b may also function to allocate a block of memory for use as the buffer memory 216b, such as by requesting an allocation of memory resources from an operating system. Following block 410, the second player 122b is ready (i.e., cued) for the second decoded video data to be read from the buffer memory 216b, as discussed by way of example in connection with FIG. 3 above.

As will be appreciated from the discussion herein, one or both of blocks 408 and 410 may be performed in parallel with blocks 402, 404, and/or 406. As a result, the second player 122b can be cued (e.g., operated to read the second encoded video file, decode the file, and populate the second buffer memory 216b with corresponding second decoded video data) to provide second decoded video data corresponding to (at least a portion of) a second encoded video file at the same time that the video playout card 132a is reading from the buffer memory 216a (or perhaps at the same time that the first video player 122a is cued).

At block 412 the video playout card 132a can read from the buffer memory 216b so as to generate a video stream corresponding to the second decoded video data loaded in the buffer memory 216b. In one example at block 412, the software switch 130a directs the video playout card 132a to switch from reading the buffer memory 216a at the first playout location (e.g., indicated by pointer $P_1$) to reading the buffer memory 216b at a second playout location (e.g., indicated by pointer $P_2$). The resulting video stream provided from the output port of the video playout card 132a thereby switches from video of the first encoded video file (e.g., file1 210a) to video of the second encoded video file (e.g., file2 210b). In some examples, the resulting video stream may switch in a duration less than a time in which a frame is output from the video playout card 132a according to a given video format. For instance, the resulting video stream may include a final frame of the first encoded video file followed, in the next immediate frame, by an initial frame of the second encoded video file. In some examples, the resulting video stream may switch between providing video from the two different encoded video files with no intervening frames in the resulting video stream (and while maintaining a frame rate of the resulting video stream according to a given standard).

As discussed above, the software switch 130a may, in turn, operate according to instructions 230 from the player controller 140 (which may in turn operate according to instructions from the scripting and sequencing system 170) so as to cause video stream output from the video playout card 132a to be in accordance with a schedule.

Moreover, as discussed in connection with FIG. 3 above, the software switch 130a and/or the player 122b can track the current read out location of the video playout card 132a. Upon portions of the buffer memory 216b being read by the video player card 132a, those portions can be made available to the player 122b for populating with decoded video data for subsequent frames of the source video file (i.e., file2 210b). As such, the video playout card 132b can cycle through the buffer memory 216b on an ongoing basis to read dynamically generated second decoded video data provided by the player 122b.

VI. Computer-Readable Medium

Figure 5:
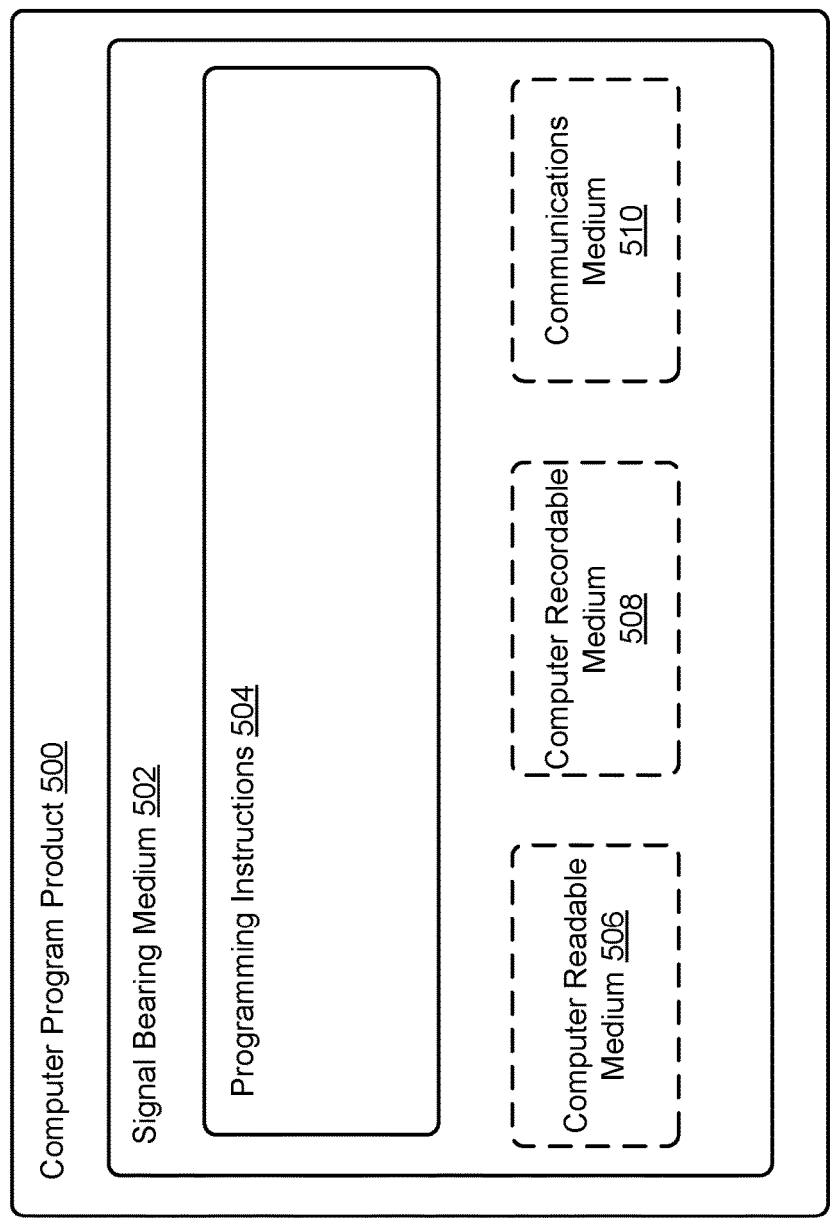
FIG. 5 depicts a non-transitory computer-readable medium configured according to an example embodiment.

FIG. 5 depicts a non-transitory computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., executable program logic stored on a memory of the player 122, the player controller 140 and/or the scripting and sequencing system 170 in FIGS. 1-3, for example). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 can include one or more programming instructions 504 that, when executed by one or more processors can provide functionality or portions of the functionality described above with respect to FIGS. 1-4. In some examples, the signal bearing medium 502 can be a computer-readable medium 506, such as, but not limited to, a hard disk drive, a Compact Disc (CD), a Digital Video Disk (DVD), a digital tape, memory, etc. In some implementations, the signal bearing medium 502 can be a computer recordable medium 508, such as, but not limited to, memory, read/write (R/W) CDs, R/W DVDs, etc. In some implementations, the signal bearing medium 502 can be a communications medium 510, such as, but not limited to, a digital and/or an analog communication medium (e.g., a fiber optic cable, a waveguide, a wired communications link, a wireless communication link, etc.). Thus, for example, the signal bearing medium 502 can be conveyed by a wireless form of the communications medium 510.

The one or more programming instructions 504 can be, for example, computer executable and/or logic implemented instructions. In some examples, a computing device is configured to provide various operations, functions, or actions in response to the programming instructions 504 and/or executable instructions conveyed to a processor or processors by one or more of the computer readable medium 506, the computer recordable medium 508, and/or the communications medium 510.

The non-transitory computer readable medium could also be distributed among multiple data storage elements, which can be remotely located from each other. The computing device that executes some or all of the stored instructions can be a handheld device, such as a personal phone, tablet, etc. Alternatively, the computing device that executes some or all of the stored instructions can be another computing device, such as a server.

VII. Example Variations

While one or more functions of the disclosed methods have been described as being performed by the certain entities, the functions may be performed by any entity, such as those included in the NPS 100 described above. Further, the described steps throughout need not be performed in the disclosed order, although in some examples, an order may be preferred. Also, not all steps need to be performed to achieve the desired advantages of the disclosed systems and methods, and therefore not all steps are required. Further, the variations described throughout this disclose may be applied to any of the disclosed systems or methods.

Further, while the disclosed video playout module and other systems have been described in connection with an NPS, it should be understood that such systems may be used in other environments and/or in connection with other types of video-related systems.

Still further, while select examples have been described, alterations and permutations of these examples will be apparent to those of ordinary skill in the art. Other changes, substitutions, and alterations are also possible without departing from the disclosed systems and methods in its broader aspects as set forth in the following claims.

The invention claimed is:

1. A non-transitory computer readable medium encoded with a set of program instructions that when executed by a processor cause performance of functions comprising:
    decoding a first encoded video file to generate first decoded video data;
    populating a memory with the first decoded video data;
    causing a video player to read from the memory so as to output a video stream, via an output port, corresponding to the first decoded video data;
    while the video player outputs the video stream corresponding to the first decoded video data: (i) decoding a second encoded video file to generate second decoded video data, and (ii) populating the memory with the second decoded video data at a particular location of the memory, and wherein decoding the second encoded video file to generate second decoded video data is performed in parallel with decoding the first encoded video file to generate first decoded video data; and
    responsive to the video player outputting the video stream corresponding to the first decoded video data, causing the video player to read from the particular location of the memory such that the video stream output from the video player via the output port switches, without user input, from corresponding to the first decoded video data, at one frame, to corresponding to the second decoded video data, at a subsequent frame, without any intervening frames between the one frame and the subsequent frame.

2. The non-transitory computer readable medium of claim 1, wherein the causing the video player to read from the memory so as to output the video stream corresponding to the first decoded video data includes directing the video player to read the decoded video data at a playout location.

3. The non-transitory computer readable medium of claim 1, the functions further comprising:
   tracking portions of the memory read by the video player; and
   responsive to a first portion of the memory being read by the video player, populating a second portion of the memory with subsequently generated decoded video data.

4. The non-transitory computer readable medium of claim 1, wherein the first encoded video file and the second encoded video file are each compressed video files, the functions further comprising:
   scanning the first encoded video file for a first predetermined initial frame; and
   scanning the second encoded video file for a second predetermined initial frame,
   wherein the populating the memory with the first decoded video data includes populating the memory with decoded video data corresponding to the first predetermined initial frame of the first encoded video file, and
   wherein the populating the memory with the second decoded video data includes populating the memory with decoded video data corresponding to the second predetermined initial frame of the second encoded video file.

5. The non-transitory computer readable medium of claim 1, the functions further comprising:
   tracking portions of the memory read by the video player; and
   responsive to a first portion of the memory being read by the video player, populating the first portion of the memory with subsequently generated decoded video data.

6. A method for operating a news production system having a video playout module, the method comprising:
   the video playout module decoding a first encoded video file to generate first decoded video data;
   the video playout module populating a memory with the first decoded video data;
   the video playout module causing a video player to read from the memory so as to output a video stream, via an output port of the video playout module, corresponding to the first decoded video data;
   the video playout module decoding a second encoded video file to generate second decoded video data;
   the video playout module populating the memory with the second decoded video data at a particular location of the memory, wherein decoding the second encoded video file to generate second decoded video data is performed in parallel with decoding the first encoded video file to generate first decoded video data; and
   responsive to the video player outputting the video stream corresponding to the first decoded video data, the video playout module causing the video player to read from the particular location of the memory such that the video stream output from the video player via the output port of the video playout module automatically switches such that a final frame of video corresponding to the first decoded video data precedes an initial frame of video corresponding to the second decoded video data, without any intervening frames between the final frame and the initial frame.

7. The method of claim 6, further comprising the video playout module receiving data identifying the first encoded video file and the second encoded video.

8. The method of claim 6, wherein decoding at least a portion of the second encoded video file is carried out in parallel with causing the video player to output the video stream corresponding to the first decoded video file.

9. The method of claim 6, wherein causing the video player to read from the particular location of the memory comprises a switcher causing the video player to read from the particular location of the memory.

10. The method of claim 6, wherein the output port of the video playout module is connected to a single video input port of a production switcher, and wherein the production switcher combines the video stream output from the video player with a second video stream to provide a second video stream output from the production switcher.

11. The method of claim 6, further comprising further decoding the second encoded video file and further populating the memory with the second decoded data while the video player outputs the video stream corresponding to the first decoded video data.

12. A system comprising:
   a plurality of software video players;
   a video playout card; and
   a control system configured to:
      instruct the plurality of software video players to decode a first encoded video file to generate first decoded video data, and decode a second encoded video file to generate second decoded video data, wherein the plurality of software video players are configured to decode, in parallel, at least a portion of the first encoded video file and at least a portion of the second encoded video file;
      cause the video playout card to provide a video stream output, via an output port of the video playout card, corresponding to the first decoded video data; and
      responsive to the video playout card providing the video stream output corresponding to the first decoded video data and without requiring further user interaction, cause the video stream output from the video playout card to switch from corresponding to the first decoded video data, at one frame, to corresponding to the second decoded video data, at a frame subsequent to the one frame, without any intervening frames between the one frame and the subsequent frame.

13. The system of claim 12, wherein the plurality of software video players includes a first software video player and a second software video player, wherein the first software video player includes a first decoding module and the second software video player includes a second decoding module distinct from the first decoding module, and wherein the control system is configured to:
   instruct the first software video player to decode the first encoded video file to generate the first decoded video data; and
   instruct the second software video player to decode the second encoded video file to generate the second decoded video data.

14. The system of claim 13, wherein the control system is configured to instruct the second video player to further decode the second encoded video file while the video playout card provides the video stream output corresponding to the first decoded video data.

15. The system of claim 12, wherein the plurality of software video players are each configured to populate a memory with the decoded video data, and wherein the video playout card is configured to read from the memory so as to provide the video stream output.

16. The system of claim 15, wherein the control system is configured to:
   instruct the plurality of software video players to populate the memory with the second decoded video data at a particular location of the memory; and
   responsive to the video playout card providing the video stream output corresponding to the first decoded video data and without requiring further user interaction, cause the video playout card to read from the particular location of the memory such that the video stream output from the video playout card switches from corresponding to the first decoded video data, at the one frame, to corresponding to the second decoded video data, at the frame subsequent to the one frame.

17. The system of claim 12, wherein the output port of the video playout card is connected to an input port of a production switcher, and wherein the production switcher combines the video stream output from the video playout card with a second video stream to provide a second video stream output from the production switcher.

18. The system of claim 12, wherein the output port of the video playout card is connected to an input port of a production switcher, and wherein the production switcher adds a digital video effect to the video stream output from the video playout card to provide a second video stream output from the production switcher.

* * * * *